United States Patent
Moon et al.

(10) Patent No.: US 7,561,880 B2
(45) Date of Patent: Jul. 14, 2009

(54) RADIO CONTROLLER, MOBILE COMMUNICATIONS SYSTEM, AND COMMUNICATIONS CONTROL METHOD

(75) Inventors: Sung Uk Moon, Yokosuka (JP); Takehiro Nakamura, Yokosuka (JP); Minami Ishii, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 659 days.

(21) Appl. No.: 11/116,254

(22) Filed: Apr. 28, 2005

(65) Prior Publication Data

US 2005/0245262 A1    Nov. 3, 2005

(30) Foreign Application Priority Data

Apr. 28, 2004    (JP) .............................. 2004-134409

(51) Int. Cl.
    *H04Q 7/20* (2006.01)
(52) U.S. Cl. .................... 455/436; 455/67.11; 455/442; 455/443; 455/432.1
(58) Field of Classification Search ................ 455/443, 455/456.1, 466, 456.2, 436, 446, 9, 115.1, 455/67.11, 514, 526, 61, 442, 437, 432.1
    See application file for complete search history.

(56) References Cited

U.S. PATENT DOCUMENTS

| | | | | |
|---|---|---|---|---|
| 5,854,981 A | * | 12/1998 | Wallstedt et al. ............ | 455/439 |
| 5,915,221 A | * | 6/1999 | Sawyer et al. ............... | 455/437 |
| 6,192,244 B1 | * | 2/2001 | Abbadessa .................. | 455/436 |
| 6,308,066 B1 | * | 10/2001 | Ranta et al. ................. | 455/436 |
| 7,082,305 B2 | * | 7/2006 | Willars et al. ............... | 455/441 |
| 7,110,766 B1 | * | 9/2006 | Tayloe et al. ................ | 455/438 |
| 7,155,223 B2 | * | 12/2006 | O'Brien ...................... | 455/436 |
| 7,421,272 B2 | * | 9/2008 | Dalsgaard et al. ........... | 455/438 |
| 2003/0181208 A1 | | 9/2003 | Lobinger et al. | |
| 2004/0147266 A1 | * | 7/2004 | Hwang et al. ............... | 455/445 |
| 2005/0048974 A1 | * | 3/2005 | Kim et al. ................... | 455/436 |

FOREIGN PATENT DOCUMENTS

| | | |
|---|---|---|
| CN | 1415176 A | 4/2003 |
| EP | 0 888 026 A2 | 12/1998 |
| WO | WO 00/36853 | 6/2000 |
| WO | WO 03/063418 A1 | 7/2003 |

OTHER PUBLICATIONS

3GPP TSG-RAN Test Specification 25.331 V5.6.0, "Radio Resource Control (RRC)", Sep. 2003, pp. 1-1006.

* cited by examiner

*Primary Examiner*—Sujatha Sharma
(74) *Attorney, Agent, or Firm*—Oblon, Spivak, McClelland, Maier & Neustadt, P.C.

(57) ABSTRACT

A radio controller of a mobile communications system performing broadcasting or multicasting that transmits the same information to multiple cells is disclosed. The radio controller includes a control information comparison part configured to compare the control information of a first one of the cells and the control information of a second one of the cells adjacent to the first one of the cells; and a control information creation part configured to create adjacent cell control information corresponding to the second one of the cells. The control information creation part determines part of the control information of the second one of the cells different from the control information of the first one of the cells as the adjacent cell control information.

8 Claims, 3 Drawing Sheets

RADIO CONTROLLER, MOBILE COMMUNICATIONS SYSTEM, AND COMMUNICATIONS CONTROL METHOD

BACKGROUND OF THE INVENTION

1. Field of the Invention

The present invention generally relates to radio controllers, mobile communications systems, and communications control methods, and more particularly to a radio controller, a mobile communications system, and a communications control method for performing broadcast or multicast communications.

2. Description of the Related Art

The control information of each cell is formed of multiple components. Components having a common characteristic are collected into a group called "system information block," and are transmitted to user equipment (UE) in the range of the cell. Such control information includes the control information of an adjacent cell. Reception of the control information of the adjacent cell enables the UE to establish a quicker connection to a line of the adjacent cell in the case of the UE moving between the cells. Such a configuration is disclosed in 3GPP TSG-RAN Test Specification 25.331 V5.6.0, "Radio Resource Control (RRC)," September, 2003.

However, the above-described conventional technique has the following disadvantage.

That is, there is a problem in that even when a first cell and a second cell adjacent thereto share a large part of the components of control information as in the case of broadcasting or multicasting, the base transceiver station of the first cell is required to transmit all the control information of the adjacent second cell, thus wasting a large part of a control signal.

SUMMARY OF THE INVENTION

Accordingly, it is a general object of the present invention to provide a radio controller, a mobile communications system, and a communications control method in which the above-described disadvantage is eliminated.

A more specific object of the present invention is to provide a radio controller, a mobile communications system, and a communications control method that can reduce the necessary amount of control information for broadcast or multicast transmission.

The above objects of the present invention are achieved by a radio controller of a mobile communications system performing broadcasting or multicasting that transmits same information to a plurality of cells, the radio controller including: a control information comparison part configured to compare control information of a first one of the cells and control information of a second one of the cells adjacent to the first one of the cells; and a control information creation part configured to create adjacent cell control information corresponding to the second one of the cells, wherein the control information creation part determines part of the control information of the second one of the cells which part is different from the control information of the first one of the cells as the adjacent cell control information.

The above objects of the present invention are also achieved by a mobile communications system performing broadcasting or multicasting that transmits same information to a plurality of cells, the mobile communications system including: a control information comparison part configured to compare control information of a first one of the cells and control information of a second one of the cells adjacent to the first one of the cells; and a control information creation part configured to create adjacent cell control information corresponding to the second one of the cells, wherein the control information creation part determines part of the control information of the second one of the cells which part is different from the control information of the first one of the cells as the adjacent cell control information.

The above objects of the present invention are also achieved by a communications control method in a mobile communications system performing broadcasting or multicasting that transmits same information to a plurality of cells, the communications control method including the steps of: (a) comparing control information of a first one of the cells and control information of a second one of the cells adjacent to the first one of the cells; and (b) determining part of the control information of the second one of the cells which part is different from the control information of the first one of the cells as adjacent cell control information corresponding to the second one of the cells.

According to one aspect of the present invention, it is possible to prevent a common part of the control information of cells concerning broadcast or multicast transmission from being transmitted redundantly, so that the adjacent cell control information can be reduced in amount.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
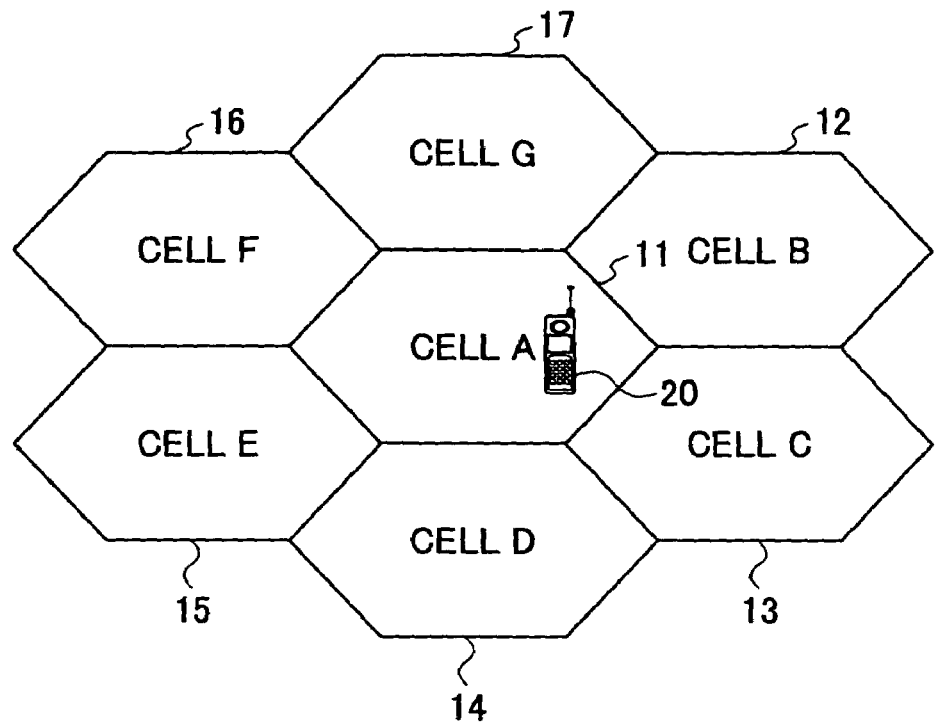
FIG. 1 is a diagram for illustrating a mobile communications system according to a first embodiment of the present invention.

A description is given below, with reference to the accompanying drawings, of embodiments of the present invention.

In the drawings for illustrating the embodiments, an element having the same function as that previously described is referred to by the same numeral, and the description thereof is not repeated.

First, a description is given of a mobile communications system according to a first embodiment of the present invention.

The mobile communications system according to this embodiment includes multiple base transceiver stations, mobile stations, and a radio control station connected to the base transceiver stations.

Each of the base transceiver stations transmits the same information, and performs broadcasting or multicasting. A description is given, with reference to FIG. 1, of the configuration of a cell covered by each base transceiver station. Each base transceiver station covers a cell formed of, for instance, a hexagonal region. As a result, the base transceiver stations cover sequentially connected hexagonal cells, that is, Cell A 11, Cell B 12, Cell C 13, Cell D 14, Cell E 15, Cell F 16, and Cell G 17.

In this embodiment, a description is given of the case where the same MBMS (Multimedia Broadcast Multicast Service) is provided in Cell A 11 through Cell G 17.

Conventionally, each base transceiver station transmits to a mobile station in the range of its own cell control information necessary for the broadcast or multicast transmission of an adjacent cell as adjacent cell information as well as control information necessary for the broadcast or multicast transmission of its own cell. For instance, a base transceiver station covering Cell A 11 transmits to a mobile station 20 the control information of Cell A 11 and the control information of the adjacent cells from Cell B 12 through Cell G 17 as adjacent cell information.

Control information necessary for broadcast or multicast transmission may be MBMS Signaling Radio Bearer Information composed of the setting information of MBMS Control Channel (MCCH), MBMS Radio Bearer Information composed of the setting information of MBMS Traffic Channel (MTCH), or Service-related Control Information composed of a service ID and an RRC connection establishment indicator.

For instance, the setting information of MTCH includes a space time transmission diversity (STTD) indicator, a spreading factor in the physical layer, a spreading code number in the physical layer, a transport format combination set (TFCS), and a transport format set (TFS). In the case of broadcasting or multicasting, the same signal is transmitted in multiple cells. Accordingly, control information for setting a channel is substantially the same.

The mobile communications system according to this embodiment performs control so as to prevent a base transceiver station providing a service from transmitting part of control information corresponding to a cell adjacent to a predetermined cell covered by the base transceiver station which part is common to the control information of the predetermined cell, thereby avoiding overlapping of the control information to be transmitted.

Figure 2:
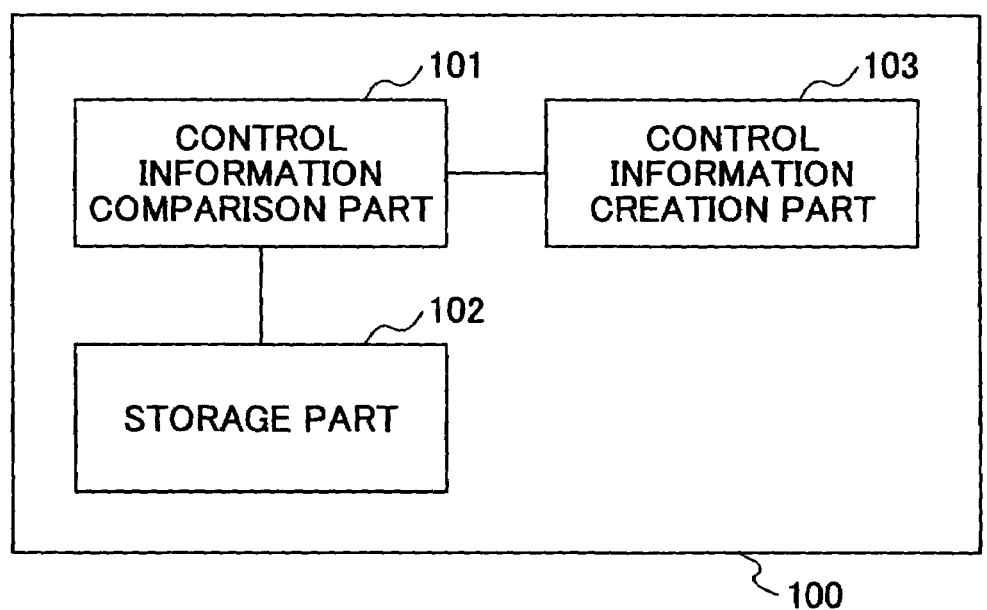
FIG. 2 is a block diagram illustrating part of a radio controller according to the first embodiment of the present invention.

A description is given, with reference to FIG. 2, of a radio controller 100 according to this embodiment.

The radio controller 100, which is provided in the radio control station, includes a control information comparison part 101, a storage part 102, and a control information creation part 103. The storage part 102 and the control information creation part 103 are connected to the control information comparison part 101.

The storage part 102 stores, for instance, the above-described MBMS Signaling Radio Bearer Information, MBMS Radio Bearer Information, or Service-related Control Information cell by cell. For instance, the storage part 102 stores, as the setting information of MTCH, MTCH setting information transmitted by a base transceiver station covering a predetermined cell and the MTCH setting information of cells adjacent thereto as illustrated in Table 1.

TABLE 1

| MTCH SETTING INFORMATION | CELL CONTROL INFORMATION (CELL A) | ADJACENT CELL INFORMATION | | | | | |
|---|---|---|---|---|---|---|---|
| | | CELL B | CELL C | CELL D | CELL E | CELL F | CELL G |
| STTD INDICATOR | ○ | ○ | ○ | ○ | ○ | ○ | ○ |
| SPREADING FACTOR | ○ | ○ | ○ | ○ | — | — | — |
| CODE NUMBER | ○ | ○ | ○ | ○ | ○ | ○ | ○ |
| TFCS | ○ | — | — | — | — | — | — |
| TFS | ○ | ○ | ○ | ○ | — | — | — |
| . | . | . | . | . | . | . | . |

○: To transmit
—: Not to transmit

The control information comparison part 101 compares the components of control information necessary for the broadcast or multicast transmission of the predetermined cell (Cell A 11) with the components of control information necessary for the broadcast or multicast transmission of the adjacent cells (Cell B 12 through Cell G 17).

The control information creation part 103 creates adjacent cell control information necessary for broadcast or multicast transmission so that, of the components of the control information necessary for the broadcast or multicast transmission of the adjacent cells, those that are the same as the components of the control information necessary for the broadcast or multicast transmission of the predetermined cell are not to be reported as the adjacent cell control information corresponding to the adjacent cells.

That is, the control information creation part 103 determines, as the adjacent cell control information, the components of the control information necessary for the broadcast or multicast transmission of the adjacent cells which components are different from the components of the control information necessary for the broadcast or multicast transmission of the predetermined cell.

Alternatively, with respect to the components of the control information necessary for the broadcast or multicast transmission of the adjacent cells which components are identical to the components of the control information necessary for the broadcast or multicast transmission of the predetermined cell, the control information creation part 103 may create information indicating their identity as the adjacent cell control information.

Thereby, overlapping of control information to be transmitted can be avoided.

For instance, in the case of transmitting the STTD Indicator (1 bit), Spreading Factor (5 bits), Code Number (5 bits), TFCS (50 bits), and TFS (20 bits) as the setting information of MTCH mapped to a service X in Cell A 11, conventionally, setting information necessary for setting MTCH of each of Cell B 12 through Cell G 17 requires an amount of information of the same number of bits, so that an attempt to transmit the MTCH setting information of Cell B 12 through Cell G 17 as the adjacent cell control information requires the amount of information of each cell times the number of cells (bits).

According to this embodiment, if, for instance, TFCS is common to Cell A 11 through Cell G 17 as illustrated in Table 1, only the control information of Cell A 11 is transmitted once, and control information concerning the adjacent cells of Cell B 12 through Cell G 17 is not transmitted. As a result, it is possible to reduce control information by "an amount of information of TFCS" times 6 (the number of cells of Cell B 12 through Cell G 17) bits. In Table 1, "-" indicates setting information necessary for setting MTCH that is shared with the predetermined cell (Cell A 11) and is not to be transmitted, and "○" indicates setting information necessary for setting MTCH that is not shared with the predetermined cell (Cell A 11) and is to be transmitted.

Further, Spreading Factor and TFS are common to Cell A 11, Cell E 15, Cell F 16, and Cell G 17. The base transceiver stations covering Cell E 15, Cell F 16, and Cell G 17, respectively, do not transmit Spreading Factor and TFS.

On the other hand, Cell E 15, Cell F 16, and Cell G 17 are different in the values of the STTD Indicator and Code Number from the predetermined cell (Cell A 11). Accordingly, the base transceiver stations covering Cell E 15, Cell F 16, and Cell G 17, respectively, transmit, as the setting information of MTCH of the adjacent cell control information, the STTD Indicator and Code Number, which are the elements of the control information different from those of Cell A 11.

Further, in this case, with respect to the Spreading Factor, TFCS, and TFS, which are common information items, information indicating identity may be transmitted as the adjacent cell control information. For instance, in the case where Cell A 11 has a Spreading Factor of 32, "1" may be transmitted if Cell B 12 also has a Spreading Factor of 32, and information indicating different contents may be transmitted if Cell B 12 has a different Spreading Factor of 64.

Figure 3:
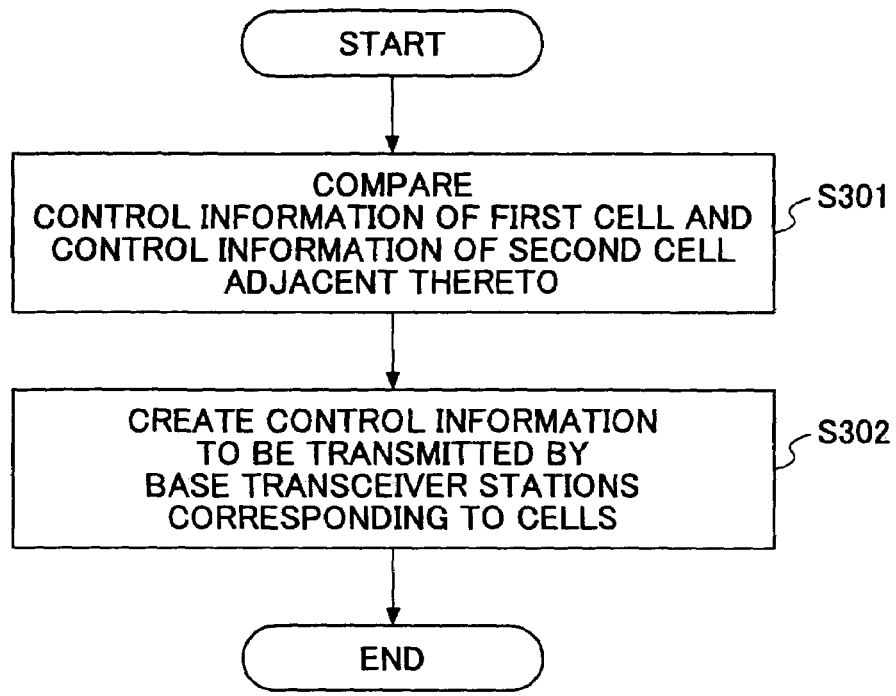
FIG. 3 is a flowchart illustrating a communications control method according to the first embodiment of the present invention.

Next, a description is given, with reference to FIG. 3, of an operation of the radio control station.

First, in step S301, the radio controller 100 compares the control information of a first cell that performs broadcast or multicast transmission and the control information of a second cell adjacent to the first cell. Next, in step S302, the radio controller 100 creates control information that base transceiver stations corresponding to the first and second cells are required to transmit. In this case, with respect to the base transceiver station corresponding to the adjacent second cell, the radio controller 100 determines control information different from the control information of the first cell as adjacent cell control information, that is, the radio controller 100 creates adjacent cell control information from control information different from the control information of the first cell.

As a result, it is possible to prevent part of the control information concerning broadcast or multicast transmission which part is common to the cells from being transmitted redundantly, so that the adjacent cell control information can be reduced in amount.

Figure 4:
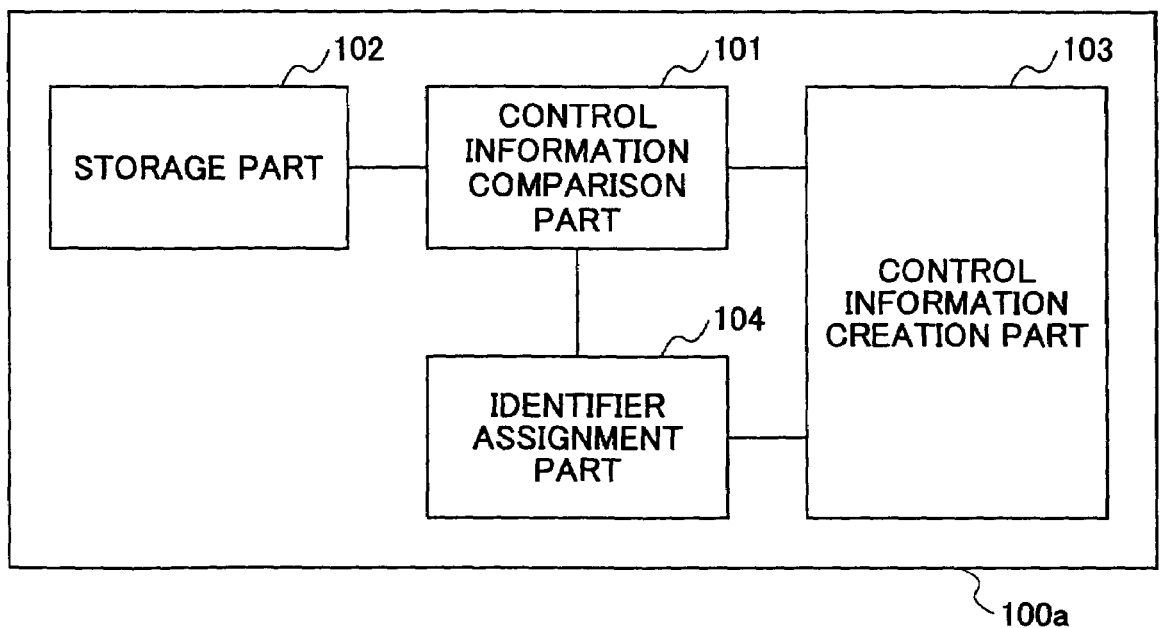
FIG. 4 is a block diagram illustrating part of a radio controller according to a second embodiment of the present invention.

Next, a description is given, with reference to FIG. 4, of a mobile communications system according to a second embodiment of the present invention.

A radio controller 100a according to this embodiment is configured by additionally providing an identifier assignment part 104 to the radio controller 100 described with reference to FIG. 2. The identifier assignment part 104 is connected to the control information comparison part 101 and the control information creation part 103.

In the radio controller 100a according to this embodiment, when there is one or more cell groups in each of which the cells are equal in each parameter of MTCH setting information as illustrated below in Table 2, the identifier assignment part 104 assigns an identifier to each cell group. In this case, the control information creation part 103 creates the control information of a predetermined cell (Cell A 11) and the control information of adjacent cells (Cell B 12 through Cell G 17) (adjacent cell control information) based on the identifiers.

TABLE 2

| MTCH SETTING INFORMATION | CELL CONTROL INFORMATION (CELL A) | ADJACENT CELL INFORMATION | | | | | |
|---|---|---|---|---|---|---|---|
| | | CELL B | CELL C | CELL D | CELL E | CELL F | CELL G |
| PATTERN NUMBER | 1 | 1 | 2 | 2 | 3 | 3 | 4 |
| STTD INDICATOR | ON | ON | ON | ON | OFF | OFF | OFF |
| SPREADING FACTOR | 32 | 32 | 32 | 32 | 64 | 64 | 16 |
| CODE NUMBER | 3 | 3 | 3 | 3 | 5 | 5 | 7 |
| TFCS | X | X | Y | Y | Z | Z | Q |
| TFS | S | S | S | S | T | T | F |

For instance, as illustrated in Table 2, Cell A 11 and Cell B 12 are equal in each parameter of MTCH setting information, Cell C 13 and Cell D 14 are equal in each parameter of MTCH setting information, and Cell E 15 and Cell F 16 are equal in each parameter of MTCH setting information. Accordingly, the four groups of Cell A 11 and Cell B 12, Cell C 13 and Cell D 14, Cell E 15 and Cell F 16, and Cell G 17 are assigned respective pattern numbers as identifiers.

As a result, the control information of all the adjacent cells can be transmitted to the mobile station 20 (FIG. 1) in the range of Cell A 11 by transmitting information of patterns corresponding to the respective pattern numbers once, so that the control information to be transmitted can be reduced in amount.

For instance, the information elements of Pattern 1 are correlated with Cell A 11 and Cell B 12, the information elements of Pattern 2 are correlated with Cell C 13 and Cell D 14, the information elements of Pattern 3 are correlated with Cell E 15 and Cell F 16, and the information elements of Pattern 4 are correlated with Cell G 17. Thereby, the mobile station 20 can obtain control information from the relationship between pattern numbers and cells.

In Table 2, with respect to TFCS, if X includes the entire contents of Y, it is possible to transmit Pattern 1 and correlate Cell-A 11 through Cell D 14 with Pattern 1.

Thereby, the control information to be transmitted can be further reduced in amount.

Next, a description is given of a mobile communications system according to a third embodiment of the present invention.

Figure 5:
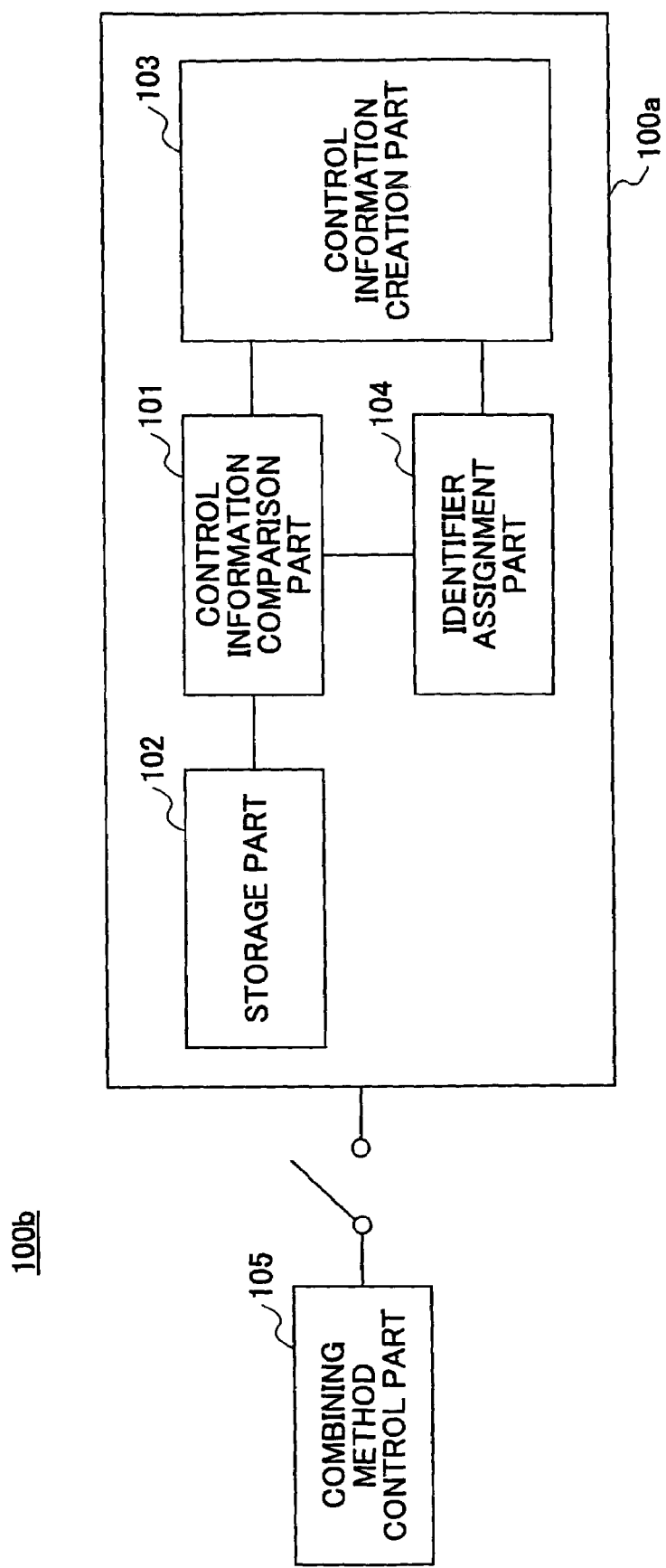
FIG. 5 is a block diagram illustrating part of a radio controller according to a third embodiment of the present invention.

A radio controller 100b according to this embodiment is configured by additionally providing a combining method control part 105 to the radio controller 100 or 100a described with reference to FIG. 2 or 4. The combining method control part 105 is connected to the radio controller 100 or 100a through a switch, and performs the same operation as in the above-described embodiments in the case of performing selective combining or soft combining of MBMS. FIG. 5 illustrates the radio controller 100b configured by additionally providing the combining method control part 105 to the radio controller 100a described with reference to FIG. 4.

In each MBMS service, the combining method control part 105 determines cell by cell whether to perform selective combining or soft combining, and performs control based on the determination so as to enable selective combining or soft combining. For instance, in the case of performing selective combining, an RLC (Radio Link Control) entity is made common to cells on which selective combining is to be performed, and contents synchronization is performed so as to enable selective combining. In the case of performing selective combining or soft combining, the switch is turned ON, and the control information comparison part 101 and the control information creation part 103 are put into operation. When the identifier assignment part 104 is provided, the identifier assignment part 104 is also put into operation.

For instance, the transmission method is set on the network side so as to enable selective combining or soft combining between cells at the time of broadcasting or multicasting. The combining method control part 105 identifies selective combining or soft combining. The control information creation part 103 does not transmit control information common to the cells, and determines different control information as adjacent cell control information as described above at the time of transmitting the adjacent cell control information based on the identified transmission method. In this case, the control information creation part 103 may create information indicating identity with respect to the common control information, or a pattern number may be assigned to the common control information in the identifier assignment part 104.

Thereby, also in the case of performing selective combining or soft combining cell by cell, it is possible to prevent a common part of the control information of cells concerning broadcast or multicast transmission from being transmitted redundantly, so that the control amount to be transmitted can be reduced in amount. Further, with the identifier assignment part 104, the control information to be transmitted can be further reduced in amount.

In the above-described embodiments, the radio controller (100, 100a, 100b) is provided in the radio control station. Alternatively, the radio controller may be provided in a base transceiver station. This can reduce processing performed by the radio control station.

According to this embodiment, in a broadcast or multicast mobile communications system transmitting the same information from multiple cells, the adjacent cell control information can be reduced in amount by preventing a common part of the control information of the cells necessary for broadcast or multicast transmission from being transmitted redundantly.

A radio controller, a mobile communications system, and a communications control method according to the present invention are applicable to mobile communications systems performing broadcast or multicast communications.

The present invention is not limited to the specifically disclosed embodiments, and variations and modifications may be made without departing from the scope of the present invention.

The present application is based on Japanese Priority Patent Application No. 2004-134409, filed on Apr. 28, 2004, the entire contents of which are hereby incorporated by reference.

What is claimed is:

1. A radio controller of a mobile communications system performing broadcasting or multicasting that transmits same information to a plurality of cells, the radio controller comprising:
    a control information comparison part configured to compare control information of a first one of the cells and control information of a second one of the cells adjacent to the first one of the cells;
    a control information creation part configured to create adjacent cell control information corresponding to the second one of the cells by determining part of the control information of the second one of the cells which part is different from the control information of the first one of the cells as the adjacent cell control information; and
    an identifier assignment part configured to form one or more cell groups, each of one or more of the cells equal in control information thereof and to assign the cell groups respective identifiers,
    wherein the control information creation part creates the adjacent cell control information for the second one of the cells when one of the identifiers assigned to the first one of the cells is different from one of the identifiers assigned to the second one of the cells, the control information comprises Multimedia Broadcast Multicast Service (MBMS) Radio Bearer Information, the MBMS Radio Bearer Information comprises setting information of MBMS Traffic Channel, and the setting information of the MBMS Traffic Channel comprises a space time transmission diversity indicator, a spreading factor in a physical layer, a spreading code number in the physical layer, a transport format combination set, and a transport format set.

2. The radio controller as claimed in claim 1, further comprising:
    a combining method control part configured to determine whether to perform selective combining or soft combining based on a transmission method set on a network side,
    wherein the control information creation part is configured to create the adjacent cell control information corresponding to the second one of the cells based on the determination.

3. The radio controller as claimed in claim 1, wherein the control information comprises Multimedia Broadcast Multicast Service (MBMS) Signaling Radio Bearer Information.

4. The radio controller as claimed in claim 3, wherein the MBMS Signaling Radio Bearer Information comprises setting information of MBMS Control Channel.

5. The radio controller as claimed in claim 1, wherein the control information comprises Service-related Control Information.

6. The radio controller as claimed in claim 5, wherein the Service-related Control Information comprises a service ID and an RRC connection establishment indicator.

7. A mobile communications system performing broadcasting or multicasting that transmits same information to a plurality of cells, the mobile communications system comprising:
- a control information comparison part configured to compare control information of a first one of the cells and control information of a second one of the cells adjacent to the first one of the cells;
- a control information creation part configured to create adjacent cell control information corresponding to the second one of the cells by determining part of the control information of the second one of the cells which part is different from the control information of the first one of the cells as the adjacent cell control information; and
- an identifier assignment part configured to form one or more cell groups, each of one or more of the cells equal in control information thereof and to assign the cell groups respective identifiers,
- wherein the control information creation part creates the adjacent cell control information for the second one of the cells when one of the identifiers assigned to the first one of the cells is different from one of the identifiers assigned to the second one of the cells, the control information comprises Multimedia Broadcast Multicast Service (MBMS) Radio Bearer Information, the MBMS Radio Bearer Information comprises setting information of MBMS Traffic Channel, and the setting information of the MBMS Traffic Channel comprises a space time transmission diversity indicator, a spreading factor in a physical layer, a spreading code number in the physical layer, a transport format combination set, and a transport format set.

8. A communications control method in a mobile communications system performing broadcasting or multicasting that transmits same information to a plurality of cells, the communications control method comprising the steps of:
- (a) comparing control information of a first one of the cells and control information of a second one of the cells adjacent to the first one of the cells;
- (b) creating adjacent cell control information corresponding to the second one of the cells by determining part of the control information of the second one of the cells which part is different from the control information of the first one of the cells as the adjacent cell control information corresponding to the second one of the cells; and
- (c) forming one or more cell groups, each of one or more of the cells equal in control information thereof, and assigning the cell groups respective identifiers,
- wherein said step (b) creates the adjacent cell control information for the second one of the cells when one of the identifiers assigned to the first one of the cells is different from one of the identifiers assigned to the second one of the cells, the control information comprises Multimedia Broadcast Multicast Service (MBMS) Radio Bearer Information, the MBMS Radio Bearer Information comprises setting information of MBMS Traffic Channel, and the setting information of the MBMS Traffic Channel comprises a space time transmission diversity indicator, a spreading factor in a physical layer, a spreading code number in the physical layer, a transport format combination set, and a transport format set.

* * * * *